United States Patent
Ly et al.

(10) Patent No.: US 10,911,271 B2
(45) Date of Patent: Feb. 2, 2021

(54) PBCH SCRAMBLING DESIGN

(71) Applicant: QUALCOMM Incorporated, San Diego, CA (US)

(72) Inventors: Hung Dinh Ly, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 16/121,534

(22) Filed: Sep. 4, 2018

(65) Prior Publication Data

US 2019/0081827 A1    Mar. 14, 2019

Related U.S. Application Data

(60) Provisional application No. 62/556,905, filed on Sep. 11, 2017.

(51) Int. Cl.
| | |
|---|---|
| *H04L 25/03* | (2006.01) |
| *H04W 56/00* | (2009.01) |
| *H04J 11/00* | (2006.01) |
| *H04W 72/04* | (2009.01) |
| *H04W 48/10* | (2009.01) |

(52) U.S. Cl.
CPC .... *H04L 25/03866* (2013.01); *H04J 11/0069* (2013.01); *H04W 56/00* (2013.01); *H04W 72/0466* (2013.01); *H04W 48/10* (2013.01)

(58) Field of Classification Search
CPC .......... H04L 25/03866; H04J 11/0069; H04W 56/00; H04W 72/0466
See application file for complete search history.

(56) References Cited

U.S. PATENT DOCUMENTS

| | | | |
|---|---|---|---|
| 2018/0091249 A1* | 3/2018 | Han | H04J 11/0076 |
| 2018/0227867 A1 | 8/2018 | Park et al. | |
| 2018/0248642 A1* | 8/2018 | Si | H04J 11/0079 |

(Continued)

FOREIGN PATENT DOCUMENTS

| | | | | |
|---|---|---|---|---|
| KR | 20170093736 | * | 7/2017 | H04W 56/001 |

OTHER PUBLICATIONS

Intel Corporation: "NR PBCH Design", 3GPP Draft, R1-1715093 PBCH Design V3, 3rd Generation Partnership Project (3GPP), Mobile Competence Centre, 650, Route Des Lucioles, F-06921 Sophia-Antipolis Cedex , France, vol. RAN WG1, No. Prague, Czech Republic, Aug. 21, 2017-Aug. 25, 2017, Aug. 26, 2017 (Aug. 26, 2017), XP051328579, 13 Pages, Retrieved from the Internet:URL:http://www.3gpp.org/ftp/tsg_ran/WG1_RL1/TSGR1_90/Docs/ [retrieved on Aug. 26, 2017].

(Continued)

*Primary Examiner* — Donald L Mills
(74) *Attorney, Agent, or Firm* — Qualcomm Incorporated

(57) ABSTRACT

Methods, systems, and devices for wireless communication are described. A base station may generate a sequence for use in scrambling a PBCH. The base station may then partition the sequence into sub-sequences based on a number of SS blocks in a SS block group. The base station may then apply each sub-sequence of the sequence as a scrambling code for the bits associated with the PBCH of a different SS block within a SS block group and transmit at least one SS block scrambled with one of the sub-sequences. A user equipment may decode the PBCH based on the sequence.

34 Claims, 11 Drawing Sheets

(56) References Cited

U.S. PATENT DOCUMENTS

| | | | |
|---|---|---|---|
| 2018/0262308 A1* | 9/2018 | Si | H04L 5/0048 |
| 2018/0279239 A1* | 9/2018 | Si | H04W 56/001 |
| 2018/0324678 A1* | 11/2018 | Chen | H04W 48/16 |
| 2019/0028244 A1* | 1/2019 | Si | H04L 5/0053 |
| 2019/0037509 A1* | 1/2019 | Li | H04W 56/001 |
| 2019/0335470 A1* | 10/2019 | Si | H04L 5/00 |
| 2019/0372711 A1* | 12/2019 | Luo | H04L 1/00 |
| 2019/0372816 A1* | 12/2019 | Si | H04L 27/2613 |
| 2020/0007371 A1* | 1/2020 | Ko | H04L 27/2613 |

OTHER PUBLICATIONS

International Search Report and Written Opinion—PCT/US2018/049610—ISA/EPO—dated Dec. 11, 2018.

ITL: "Remaining Details on SS Block and Timing Indication", 3GPP Draft, R1-1714405, 3rd Generation Partnership Project (3GPP), Mobile Competence Centre, 650, Route Des Lucioles, F-06921 Sophia-Antipolis Cedex, France, vol. RAN WG1, No. Prague, P.R. Czechia, Aug. 21, 2017-Aug. 25, 2017, Aug. 20, 2017 (Aug. 20, 2017), XP051317185, 4 Pages. Retrieved from the Internet: URL:http://www.3gpp.org/ftp/Meetings_3GPP_SYNC/RAN1/Docs/ [retrieved on Aug. 20, 2017].

LG Electronics: "Discussion on SS Block Time Index Indication", 3GPP Draft, R1-1710260 LG_Discussion on SS Block Time Index Indication, 3rd Generation Partnership Project (3GPP), Mobile Competence Centre, 650, Route Des Lucioles, F-06921 Sophia-Antipolis Cedex. vol. RAN WG1, No. Qingdao, P.R. China, Jun. 27, 2017-Jun. 30, 2017, Jun. 26, 2017 (Jun. 26, 2017), XP051299477, 7 Pages, Retrieved from the Internet: URL:http://www.3gpp.org/ftp/Meetings_3GPP_SYNC/RAN1/Docs/ [retrieved on Jun. 26, 2017].

"LTE; Evolved Universal Terrestrial Radio Access (E-UTRA); Physical Channels and Modulation (3GPP TS 36.211 version 14.3.0 Release 14)", ETSI Technical Specification, European Telecommunications Standards Institute (ETSI), 650, Route Des Lucioles, F-06921 Sophia-Antipolis, France, vol. 3GPP RAN, No. V14.3.0, Aug. 10, 2017 (Aug. 10, 2017), pp. 1-197, XP014301797, Retrieved from the Internet: URL:http://www.etsi.org/deliver/etsi_ts/136200_136299/136211/14.03.00_60/ts_136211v140300p.pdf [retrieved on Aug. 10, 2017].

NTT DOCOMO et al., "Discussion on NR-PBCH Design and PBCH-DMRS Design", 3GPP Draft, R1-1713898_Discussion on NR-PBCH Design and PBCH-DMRS Design Final, 3rd Generation Partnership Project (3GPP), Mobile Competence Centre, 650, Route Des Lucioles, F-06921 Sophia-Antipolis vol. RAN WG1, No. Prague, Czech Republic, Aug. 21, 2017-Aug. 25, 2017, Aug. 20, 2017 (Aug. 20, 2017), XP051316690, 11 Pages Retrieved from the Internet: URL:http://www.3gpp.org/ftp/Meetings_3GPP_SYNC/RAN1/Docs/ [retrieved on Aug. 20, 2017].

* cited by examiner

PBCH SCRAMBLING DESIGN

CLAIM OF PRIORITY UNDER 35 U.S.C. § 119

The present Application for Patent claims priority to Provisional Application No. 62/556,905 entitled "PBCH SCRAMBLING DESIGN" filed Sep. 11, 2017 assigned to the assignee hereof and hereby expressly incorporated by reference herein.

BACKGROUND

Aspects of the present disclosure relate generally to wireless communication systems and to broadcast channel scrambling design.

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

SUMMARY

A base station may generate a sequence for use in scrambling a PBCH. The base station may then partition the sequence into sub-sequences based on a number of SS blocks in a SS block group. The base station may then apply each sub-sequence of the sequence as a scrambling code for the bits associated with the PBCH of a different SS block within a SS block group and transmit at least one SS block scrambled with one of the sub-sequences. A user equipment may decode the PBCH based on the sequence.

A method for scrambling a broadcast channel is described. The method may include generating a sequence for use in scrambling a PBCH, partitioning the sequence into sub-sequences based on a number of SS blocks in a SS block group, applying each sub-sequence of the sequence as a scrambling code for the bits associated with the PBCH of a different SS block within a SS block group, and transmitting at least one SS block scrambled with one of the sub-sequences.

An apparatus for scrambling a broadcast channel is described. The apparatus may include a processor, memory in electronic communication with the processor, and instructions stored in the memory and operable, when executed by the processor, to cause the apparatus to generate a sequence for use in scrambling a PBCH, partition the sequence into sub-sequences based on a number of SS blocks in a SS block group, apply each sub-sequence of the sequence as a scrambling code for the bits associated with the PBCH of a different SS block within a SS block group, and transmit at least one SS block scrambled with one of the sub-sequences.

A non-transitory computer-readable medium storing code for wireless communication is described. The code may include instructions executable to generate a sequence for use in scrambling a PBCH, partition the sequence into sub-sequences based on a number of SS blocks in a SS block group, apply each sub-sequence of the sequence as a scrambling code for the bits associated with the PBCH of a different SS block within a SS block group, and transmit at least one SS block scrambled with one of the sub-sequences.

An apparatus for wireless communication is described. The apparatus may include means for generating a sequence for use in scrambling a PBCH, means for partitioning the sequence into sub-sequences based on a number of SS blocks in a SS block group, means for applying each sub-sequence of the sequence as a scrambling code for the bits associated with the PBCH of a different SS block within a SS block group, and means for transmitting at least one SS block scrambled with one of the sub-sequences.

In some examples of the method, apparatuses, or non-transitory computer-readable medium described herein, the sequence is a pseudo-noise (PN) sequence generated based on a physical cell identification (ID) of a base station. In some cases, the PN sequence is generated such that a length of the PN sequence is a product of the number of SS blocks and a number of coded PBCH bits. Some examples of the method, apparatuses, or non-transitory computer-readable medium described herein may further include processes, features, means, or instructions for determining a number of synchronization signal (SS) blocks in each SS block group of a SS burst set, determining a number of bits associated with the PBCH in each SS block, and generating the sequence based on the number of SS blocks and the number of bits. In some cases, the sequence is generated based on a physical cell identification (ID) of a base station and a portion of system frame number (SFN) bits. In some cases, the bits associated with the PBCH comprise bits of the PBCH payload to be scrambled in a SS block. In some cases, the sequence is generated such that a length of the sequence is a product of the number of SS blocks and the number of PBCH bits to be scrambled.

In some cases, a particular sub-sequence applied to a particular SS block is unique to the particular SS block within the SS block group. In some cases, a particular sub-sequence applied to a particular SS block is a same sub-sequence applied to a corresponding SS block in another SS block group of a SS burst set. In some cases, a number of least significant bits of a SS block index of the at least one SS block are included in a demodulation reference signal (DMRS) signal of the at least one SS block. In some cases, remaining bits of the SS block index are included in a payload of a PBCH of the at least one SS block. In some cases, each sub-sequence of the sequence corresponds to a different one of the number of least significant bits of the SS block index included in the DMRS signal. In some cases, the number of least significant bits of the SS block index comprises the two least significant bits or the three least significant bits.

A method for scrambling a broadcast channel is described. The method may include generating a sequence with a length based on a number of bits associated with a Physical Broadcast Channel (PBCH), applying the sequence as a scrambling code to the PBCH of each synchronization signal (SS) block within a SS burst set, and transmitting the SS burst set with at least one SS block scrambled with the sequence.

In some examples of the method, apparatuses, or non-transitory computer-readable medium described herein, the number of bits is a number of coded PBCH bits within the at least one SS block. In some cases, the sequence is applied as the scrambling code to the coded PBCH bits. In some cases, the number of bits is a number of PBCH bits to be scrambled in the at least one SS block. In some cases, the sequence is applied as the scrambling code to the PBCH bits to be scrambled. Some examples of the method, apparatuses, or non-transitory computer-readable medium described herein may further include processes, features, means, or instructions for applying the sequence as the scrambling code to the PBCH of each SS block within a second SS burst set within a same Broadcast Channel (BCH) Transmission Time Interval (TTI). In some cases, the generating the sequence includes initializing the sequence based on a three least significant bits of a system frame number. Some examples of the method, apparatuses, or non-transitory computer-readable medium described herein may further include processes, features, means, or instructions for applying a different sequence as the scrambling code to the PBCH of each SS block within a second SS burst set within a same Broadcast Channel (BCH) Transmission Time Interval (TTI).

A method for wireless communications is described. The method may comprise receiving a demodulation reference signal (DMRS) associated with a synchronization signal (SS) block, identifying a portion of an index of the SS block from the DMRS, determining a sequence used to scramble the SS block based on the portion of the index, and decoding a Physical Broadcast Channel (PBCH) of the SS block based on the sequence.

An apparatus for scrambling a broadcast channel is described. The apparatus may include a processor, memory in electronic communication with the processor, and instructions stored in the memory and operable, when executed by the processor, to cause the apparatus to receive a demodulation reference signal (DMRS) associated with a synchronization signal (SS) block, identify a portion of an index of the SS block from the DMRS, determine a sequence used to scramble the SS block based on the portion of the index, and decode a Physical Broadcast Channel (PBCH) of the SS block based on the sequence.

A non-transitory computer-readable medium storing code for wireless communication is described. The code may include instructions executable to receive a demodulation reference signal (DMRS) associated with a synchronization signal (SS) block, identify a portion of an index of the SS block from the DMRS, determine a sequence used to scramble the SS block based on the portion of the index, and decode a Physical Broadcast Channel (PBCH) of the SS block based on the sequence.

An apparatus for wireless communication is described. The apparatus may include means for receiving a demodulation reference signal (DMRS) associated with a synchronization signal (SS) block, means for identifying a portion of an index of the SS block from the DMRS, means for determining a sequence used to scramble the SS block based on the portion of the index, and means for decoding a Physical Broadcast Channel (PBCH) of the SS block based on the sequence.

In some examples of the method, apparatuses, or non-transitory computer-readable medium described herein, the portion of the index comprises a number of least significant bits of the index. In some cases, the decoding of the PBCH is performed without blind decoding. In some cases, the sequence comprises a sub-sequence of a pseudo-noise (PN) sequence. Some examples of the method, apparatuses, or non-transitory computer-readable medium described herein may further include processes, features, means, or instructions for determining different sequences for decoding the PBCH of different SS blocks within an SS block group or determining the sequence for decoding the PBCH of a corresponding SS block within a different SS block group.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
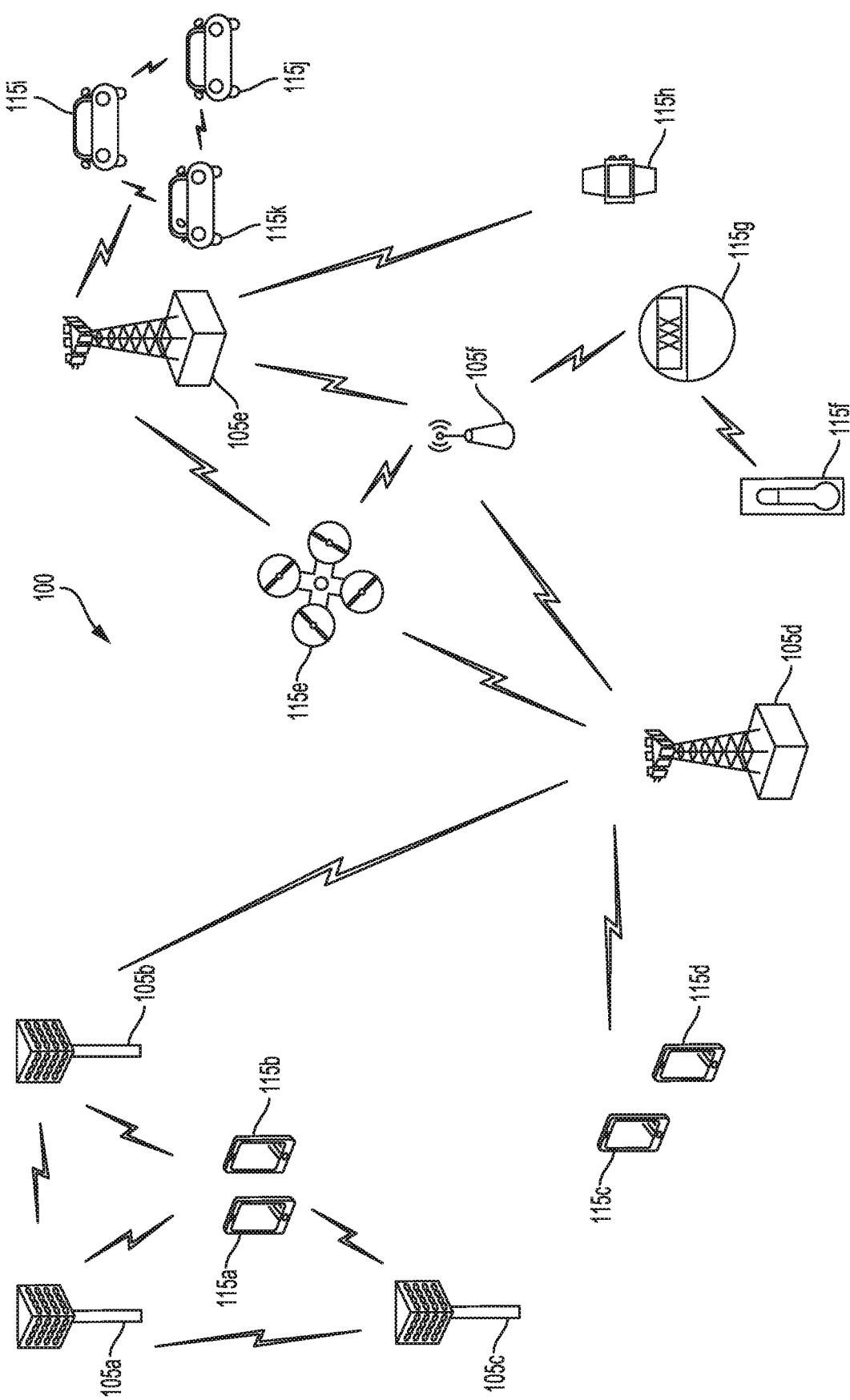
FIG. 1 is a block diagram illustrating details of a wireless communication system.

A cell search procedure in wireless cellular communication systems allows devices to acquire cell and synchronization information. The cell search procedure may involve the broadcasting of certain physical signals in each cell. In some instances, a base station transmits a primary synchronization signal (PSS) and a secondary synchronization signal (SSS) to facilitate cell search and acquisition. The detection and processing of the PSS and SSS by a user equipment (UE) may enable time and frequency synchronization as well as provide the physical layer identity of the cell to the UE, in addition to other initial access information.

In certain configurations, such as in a new radio (NR) configuration, a base station may transmit a synchronization signal (SS) block comprising a PSS and SSS multiplexed with a physical broadcast channel (PBCH). In some instances, the PBCH may include reference signals such as demodulation reference signals (DMRS) signals. The SS block may, in some cases, also be referred to as a SS/PBCH block because it comprises both synchronization signals and a PBCH. The base station may transmit an SS block burst, comprising multiple and repeated SS block transmissions within a particular time frame to facilitate coverage enhancement or a beam sweeping procedure of transmitting synchronization signals to UEs in different locations.

The time frame within which the number of SS block transmissions are sent may be a discovery reference signal (DRS) measurement timing configuration (DMTC) window. The DMTC window may be a time frame within which the UE may measure DRS for a cell, including synchronization signals, cell specific reference signals, a master information block (MIB) and other signaling useful for identifying or attaching to a cell.

In some instances, the number of SS block transmissions within the DMTC window may be limited based on factors such as the subcarrier spacing used by the system or frequency band in which the base station operates. For example, in current NR (5G new radio) agreement, if the system operates in a frequency band below 3 GHz, the base station may be limited to a maximum of four SS block transmissions within a 5 ms time frame. In another example, if the system operates in a frequency band between 3 and 6 GHz, the base station may be limited to a maximum of eight SS block transmissions within a 5 ms time frame. In yet another example, if the system operates in a frequency band above 6 GHz, the base station may be limited to a maximum of sixty-four SS block transmissions within a 5 ms time frame. The SS blocks within a SS burst set may each be associated with an index to differentiate from other SS blocks within the SS burst set. The index may allow a UE to determine timing of a received SS block relative to a measurement window or other reference point.

In cellular communications, wireless devices in one cell may experience interference from signals from other cells. A receiver that receives a signal from a transmitter as well as signals from other transmitters may be unable to properly decode the combined signals. Scrambling of wireless signals using particular scrambling codes may allow the receiver to descramble the signals and differentiate the intended signal from interfering signals. Without knowledge of the particular scrambling sequence used for a signal, a receiver may perform blind decoding to decode the signal.

Blind decoding, however, may require additional operations at the receiver and also result in extraneous power usage. A scrambling code design that allows decoding of a signal without blind decoding may result in more efficient operations at a receiver. For example, a first scrambling code may be applied to certain bits of a PBCH in a SS block while some bits of the PBCH are not scrambled with the first scrambling code. Accordingly, a second scrambling code may be designed that will scramble all the PBCH bits without requiring a UE to perform blind decoding of the PBCH to decode from the second scrambling code. In some instances, a portion of the index of a particular SS block may be signaled in the DMRS of that SS block. Because the UE may read the portion of the index in the DMRS without blind decoding, the UE may use the portion of the index to determine information for unscrambling the PBCH. In some instances, the base station may use a one-to-one mapping of the portion of the SS block index in DMRS to a particular sequence used for scrambling the PBCH of the SS block with the index. Accordingly, a UE may know the particular sequence used when it reads the portion of the index in the DMRS and use that portion of the index for descrambling PBCH. Various aspects are included in the scope of the present disclosure, such as applying a similar scrambling design to the first scrambling code.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to a scrambling design for PBCH that improves PBCH decoding efficiency, among other benefits. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth, for example. For other various indoor wideband implementations, using a TDD over the unlicensed portion of the 5 GHz band, the subcarrier spacing may occur with 60 kHz over a 160 MHz bandwidth, for example. Finally, for various deployments transmitting with mmWave components at a TDD of 28 GHz, subcarrier spacing may occur with 120 kHz over a 500 MHz bandwidth, for example. Other deployments of different subcarrier spacing over different bandwidths are also within the scope of the present disclosure.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating a network 100 including various base stations and UEs configured according to aspects of the present disclosure. The network 100 may comprise a 5G network 100 that includes a number of evolved node Bs (eNBs) 105 and other network entities. An eNB may be a station that communicates with the UEs and may also be referred to as a base station, an access point, a gNB, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105*d* and 105*e* are regular macro eNBs, while eNBs 105*a*-105*c* are macro eNBs enabled with one of 3 dimension (3D), full dimension (FD), or massive MIMO. eNBs 105*a*-105*c* take advantage of their higher dimension MIMO capabilities to exploit 3D beamforming in both elevation and azimuth beamforming to increase coverage and capacity. eNB 105*f* is a small cell eNB which may be a home node or portable access point. An eNB may support one or multiple (e.g., two, three, four, and the like) cells.

The 5G network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the eNBs, whether macro eNB, small cell, or the like. In FIG. 1, a lightning bolt (e.g., communication links) indicates wireless transmissions between a UE and a serving eNB, which is an eNB designated to serve the UE on the downlink and/or uplink, or desired transmission between eNBs, and backhaul transmissions between eNBs.

The communication links depicted in FIG. 1 may include communication links in licensed, unlicensed, or shared radio frequency (RF) spectrum. In some instances, a shared spectrum band may refer to spectrum that is lightly licensed and/or in which there may be some level of coordination among communications of different radio access technologies (RATs) or some level of preference given to communications of a particular RAT, such as an incumbent RAT, for example. In other instances, a shared spectrum band may generally refer to spectrum in which different RATs coexist or operate within the same RF spectrum band, which may include lightly licensed/coordinated spectrum or, alternatively, purely unlicensed spectrum in which different RATs may freely contend for access to the channel medium using various channel contention techniques. The aspects described in the present disclosure may be applicable to various shared or unlicensed spectrum regimes. Accordingly, the terms shared spectrum and unlicensed spectrum are used interchangeably herein unless otherwise noted.

In operation at 5G network 100, eNBs 105a-105c serve UEs 115a and 115b using 3D beamforming and coordinated spatial techniques, such as coordinated multipoint (CoMP) or multi-connectivity. Macro eNB 105d performs backhaul communications with eNBs 105a-105c, as well as small cell, eNB 105f. Macro eNB 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also supports mission critical communications with ultra-reliable and redundant links for mission critical devices, such as UE 115e, which is a drone in the example depicted in FIG. 1. Redundant communication links with UE 115e include from macro eNBs 105d and 105e, as well as small cell eNB 105f. Other machine type devices, such as UE 115f (thermometer), UE 115g (smart meter), and UE 115h (wearable device) may communicate through 5G network 100 either directly with base stations, such as small cell eNB 105f, and macro eNB 105e, or in multi-hop configurations by communicating with another user device which relays its information to the network, such as UE 115f communicating temperature measurement information to the smart meter, UE 115g, which is then reported to the network through small cell eNB 105f. 5G network 100 may also provide additional network efficiency through dynamic, low-latency TDD/FDD communications, such as in a vehicle-to-vehicle (V2V) mesh network between UEs 115i-115k communicating with macro eNB 105e.

In a 5G network 100, a base station 105 may transmit synchronization signals in the form of SS blocks to UEs 115 to allow UEs 115 to obtain synchronization information of the network. Certain predefined resources are allocated for SS block transmission within a particular time window, but the base station 105 may be restricted (e.g., as dictated by wireless standards) in the number of SS block transmissions it may transmit within a particular time window (e.g., DMTC window). The SS block transmissions, however, may each include an index (e.g., SS block index) contained in DMRS to indicate to a UE 115 which particular SS block transmission among multiple possible SS blocks is currently received at the UE 115.

Due to potential interference from surrounding base stations 105, a base station 105 may scramble the payload of the PBCH of SS block transmissions. Some bits of the PBCH, however, may not be scrambled according to certain implementations. Thus, a second scrambling code may be applied to all coded bits of the PBCH to resolve interference from other base stations 105. In order to reduce blind decoding required for the additional scrambling, the base station 105 may use a different scrambling sequence for each SS block in a SS block group but apply a one-to-one mapping of the scrambling sequence used for a particular SS block and a particular number of least significant bits of the index of the SS block included in the DMRS of the SS block. The number of least significant bits of the SS block index may comprise two bits, three bits, or other number of bits. In some instances, the number of least significant bits of the SS block index included in the DMRS may be based on a maximum number of SS blocks that can be transmitted within a DMTC window or on a sub-carrier spacing used by the system within which the SS blocks are transmitted. For illustration purposes, the present disclosure refers to including the three least significant bits of the SS block index in DMRS. Accordingly, the UE 115 may read the three least significant bits of the SS block index from DMRS and determine the particular sequence used to scramble the PBCH of the received SS block. The UE 115 may then use the particular sequence to descramble the PBCH from the scrambled code applied. In some instances, the base station 105 may apply different scrambling sequences to SS blocks within a SS block group, but the same sequence to corresponding SS blocks in another SS block group.

Figure 2:
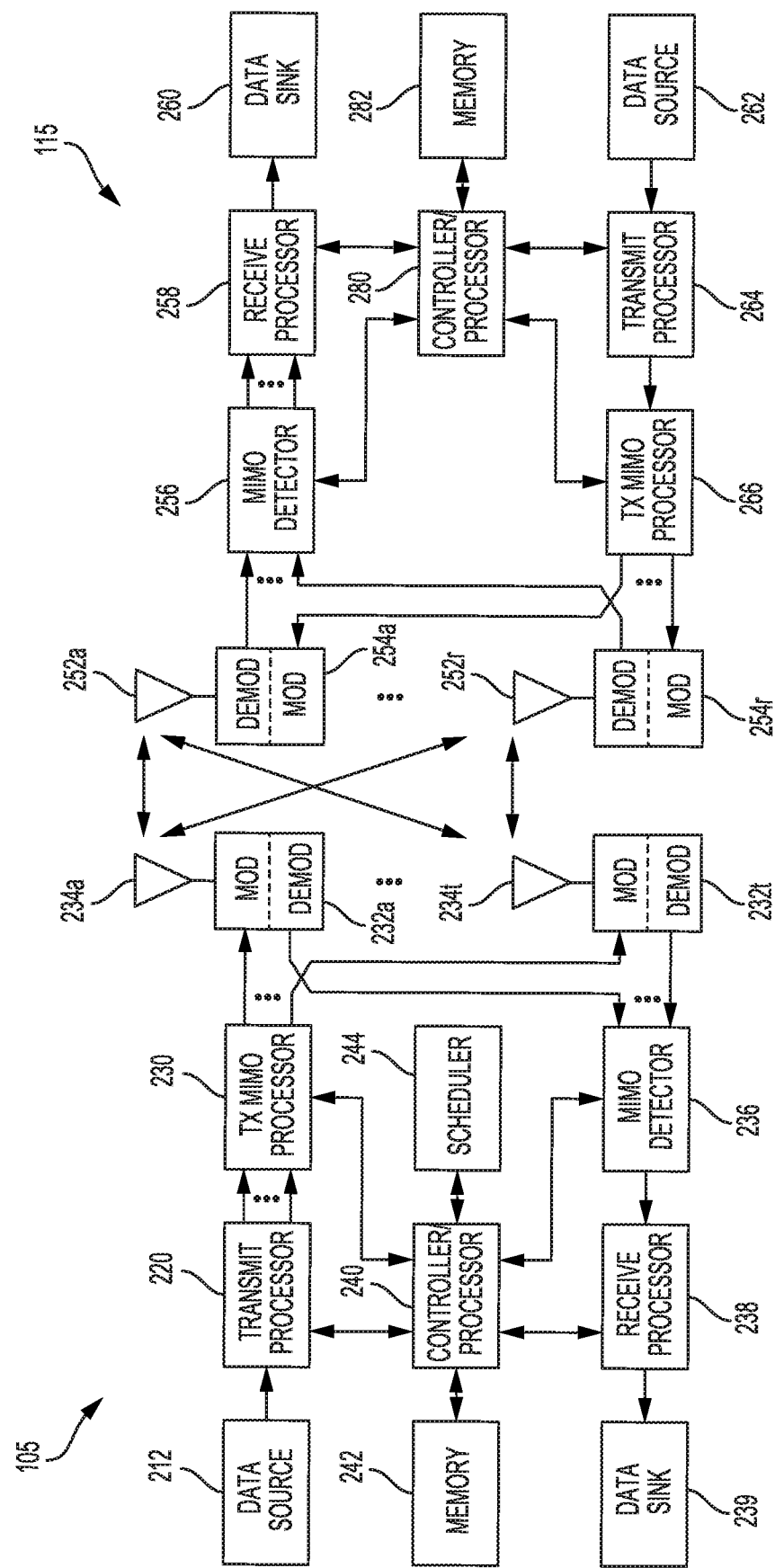
FIG. 2 is a block diagram illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. At the eNB 105, a transmit processor 220 may receive data from a data source 212 and control information from a controller/processor 240. The control information may be for various control channels such as the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of the functional blocks illustrated in FIGS. 6, 8, and 9, and/or other various processes for the techniques described herein. The controllers/processor 280 and/or other processors and modules at the UE 115 may also perform or direct the execution of the functional blocks illustrated in FIG. 10, and/or other processes for the techniques described herein. The memories 242 and 282 may store data and program codes for the eNB 105 and the UE 115, respectively. For example, memory 242 may store instructions that, when performed by the processor 240 or other processors depicted in FIG. 2, cause the base station 105 to perform operations described with respect to FIGS. 6, 8, and 9. Similarly, memory 282 may store instructions that, when performed by processor 280 or other processors depicted in FIG. 2, cause the UE 115 to perform operations described with respect to FIG. 10. A scheduler 244 may schedule UEs for data transmission on the downlink and/or uplink.

While blocks in FIG. 2 are illustrated as distinct components, the functions described above with respect to the blocks may be implemented in a single hardware, software, or combination component or in various combinations of components. For example, the functions described with respect to the transmit processor 220, the receive processor 238, or the TX MIMO processor 230 may be performed by or under the control of processor 240.

Figure 3:
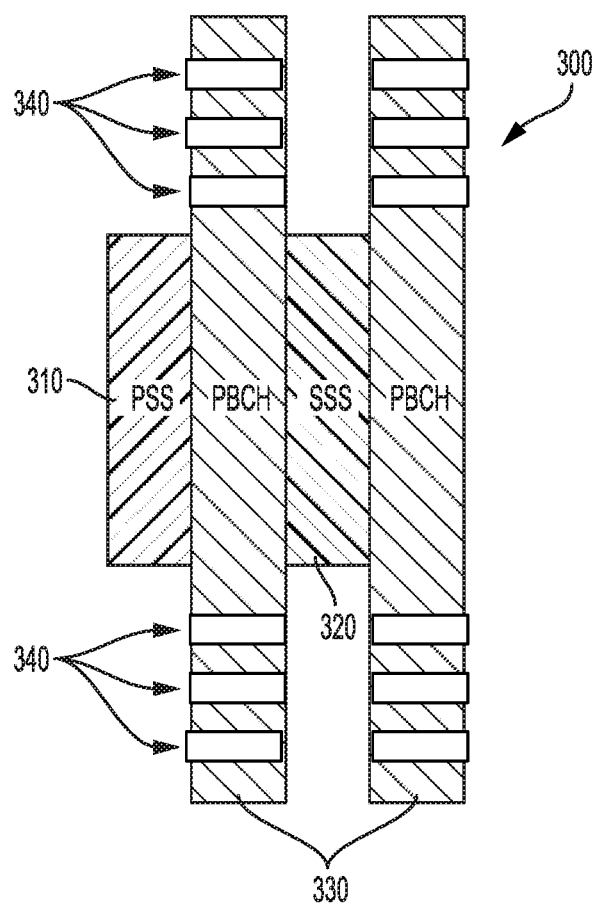
FIG. 3 illustrates an example structure of a SS block.

In 5G network 100, cell synchronization procedures may involve base station 105 broadcasting a set of signals in a synchronization signal (SS) block to facilitate cell search and synchronization by UEs 115. FIG. 3 illustrates an example of the structure of a SS block 300 broadcasted by base station 105. The configuration of SS block 300 includes a PSS 310, a SSS 320, and PBCH 330 multiplexed between the PSS 310 and SSS 320 as shown in FIG. 3. The PBCH 330 may include reference signals such as demodulation reference signals (DMRS) 340. Accordingly, each SS block 300 transmitted by base station 105 may help the UE 115 determine system timing information such as a symbol timing based on PSS 310, cell identification based on PSS 310 and SSS 320, and other parameters needed for initial cell access based on a Master Information Block (MIB) sent in the PBCH 330.

In some implementations, the PSS 310 and SSS 320 each occupy one symbol in the time domain, while the PBCH 330 occupies two symbols but is split into two parts with a first half in one symbol between the PSS 310 and SSS 320, and a second half in a second symbol after SSS 320, as seen in FIG. 3. In the frequency domain, the PSS 310 and SSS 320 may each occupy 127 resource elements or subcarriers, while the PBCH 330 may occupy 288 resource elements. The frequency location of the SS block 300 may not necessarily be in the center 6 resource blocks of the frequency band but may vary depending on the sync raster and may be a function of channel raster parameters.

Base station 105 may periodically transmit an SS block 300 to allow UEs 115 the opportunity to synchronize with the system. In 5G networks, however, the base station 105 may transmit multiple instances of SS blocks in a synchronization burst, instead of, for example, only one instance of PSS and SSS every 5 ms. In a synchronization burst, multiple SS block transmissions may be sent within a 5 ms time window. The multiple SS block transmissions may allow for coverage enhancements and/or directional beams to UEs in different locations. The base station 105, however, may be limited by predefined rules in the number of SS blocks and the corresponding locations of the SS blocks it can transmit within a particular time frame. The limitations may be based on various factors, including the particular subcarrier spacing used by the system and the frequency band in which the system operates. The maximum number of SS blocks that may be transmitted in a measurement window may be referred to as a SS burst set, and each SS block within the SS burst set may be identified by an index. In some implementations, the three least significant bits of the SS block index are carried in DMRS, while remaining bits are carried in a payload of the PBCH.

Figure 4:
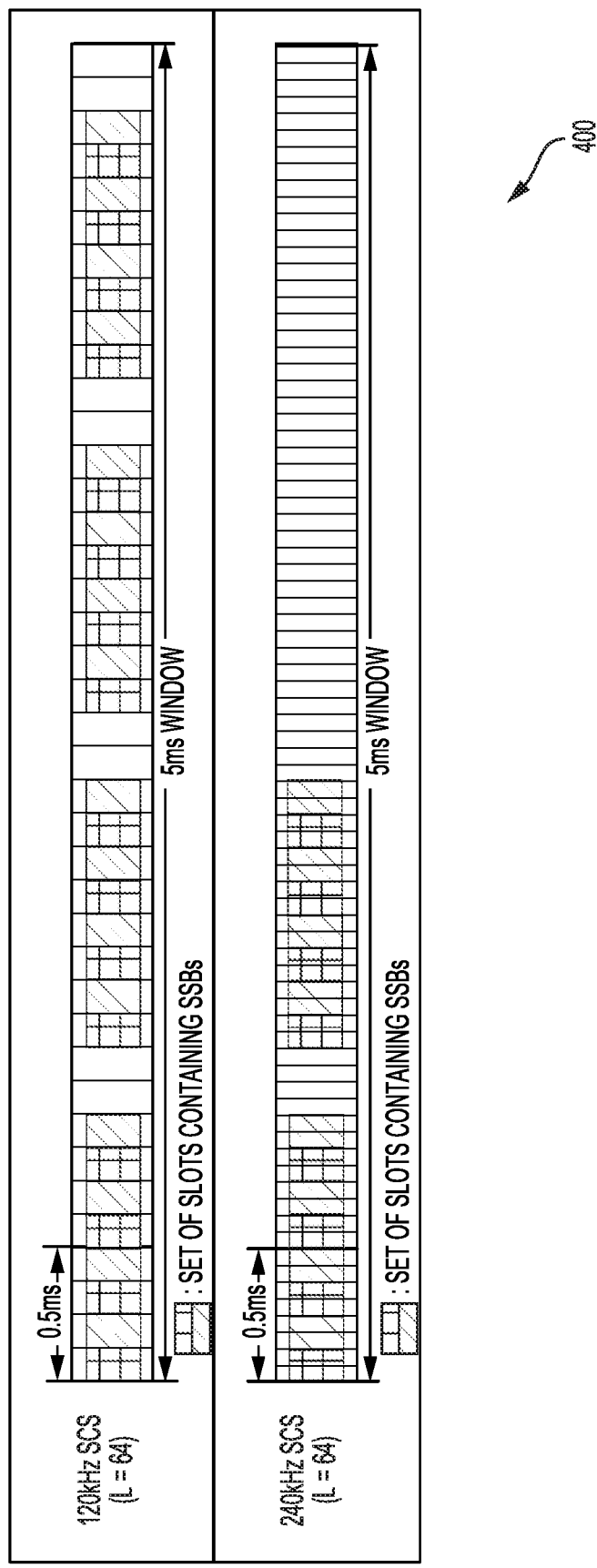
FIG. 4 illustrates example configurations of patterns of SS block transmission opportunities.

FIG. 4 illustrates example configurations 400 of patterns of SS block transmission opportunities based on various system parameters. As shown in FIG. 4, the number of SS block transmission opportunities and their corresponding locations that a base station 105 has within a measurement window (e.g., 5 ms window) may depend on the subcarrier spacing employed by the system and the frequency band in which the system operates. The UE may measure cell DRS according to periodically configured discovery reference signal (DRS) measurement timing configuration (DMTC) periods window. The DMTC may be configured for measurements of a serving cell or neighbor cells, or both. Further, the DMTC may be frequency specific or may be applicable to multiple frequencies in various examples. The length of a slot in each configuration may vary depending on the subcarrier spacing used in the configuration. In configuration 410, a subcarrier spacing of 120 kHz is used within an over-6 GHz frequency band (e.g., 60 GHz frequency band). Within a 5 ms window, the base station 105 in this configuration 410 may be allowed to transmit L=64 SS blocks (i.e., two SS blocks per slot), which may be required to be transmitted according to a particular pattern of allocated resources for the SS blocks. In configuration 420, a subcarrier spacing of 240 kHz is used within a frequency band of over 6 GHz (e.g., 60 GHz), and the maximum number of SS block transmissions is L=64, which may be required to be transmitted according to a particular pattern of allocated resources for the SS blocks. The 64 SS blocks may be referred to as an SS block burst set. The pattern and maximum number of SS blocks allowed within a measurement window may vary in other configurations, depending on the subcarrier spacing used and frequency band in which the base station 105 and UE 115 operate. Although FIG. 4 depicts examples of L=64 SS blocks in an SS burst set, other configurations may also be used. For example, a configuration of L=4 or L=8 SS blocks in a SS burst set, with subcarrier spacing of 15 kHz or 30 kHz, may also be used and are within the scope of the present disclosure.

Figure 5:
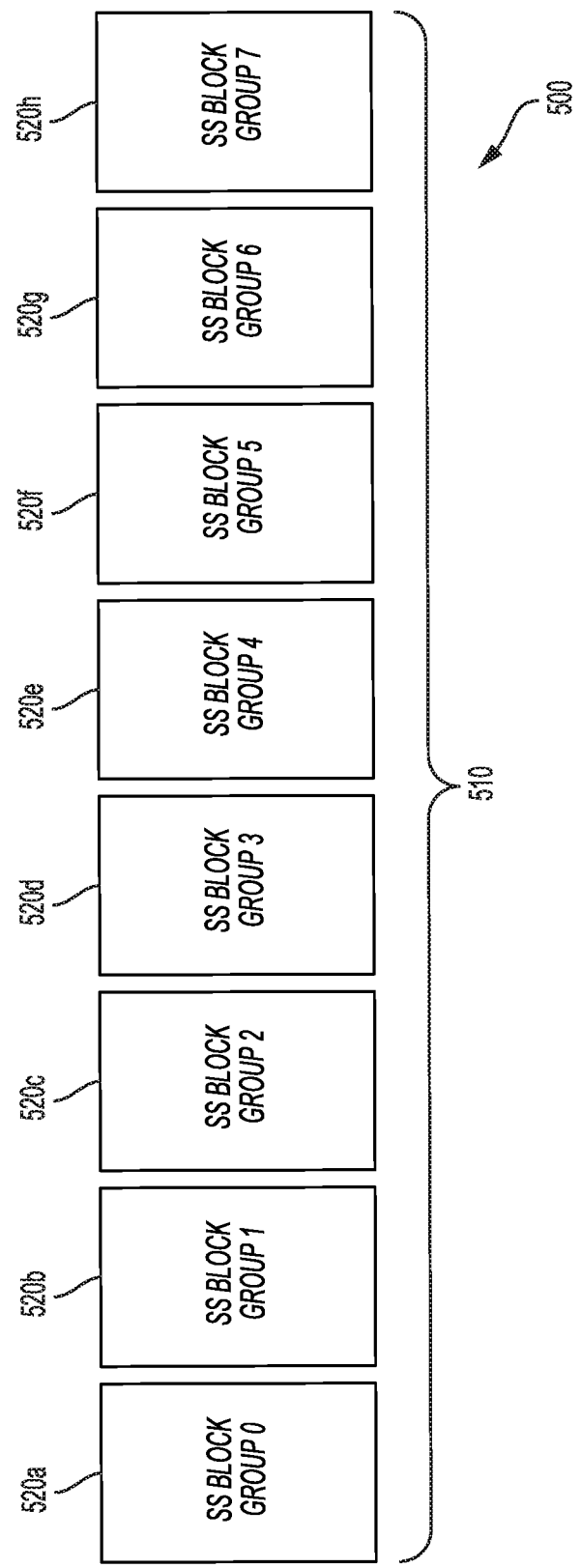
FIG. 5 illustrates an example sequence of SS block groups.

As described herein, a SS burst set may comprise up to 64 SS blocks in some cases. In some instances, a base station 105 may divide the SS blocks in a SS burst set into SS block groups for various purposes, such as for facilitating indication of transmitted SS blocks. FIG. 5 illustrates an example set 500 of groups of SS blocks in accordance with aspects described in the present disclosure. The illustrated blocks in FIG. 5 represent sequential ordering of groups of SS blocks within a SS burst set, and not necessarily physical resources allocated for the groups. A base station 105 operating in an over 6 GHz frequency band would have a maximum of L=64 SS blocks that it could transmit within a burst set 510. In some instances, the base station 105 may divide the total maximum SS blocks into N groups, with each group comprising M SS blocks. The illustrated example depicts a division of SS blocks in the burst set 510 into different SS block groups 520a-h. If the total number of SS blocks in the measurement window 510 is 64, the base station 105 may divide the 64 SS blocks into eight groups, with each of the eight groups further comprising eight SS blocks.

Figure 6:
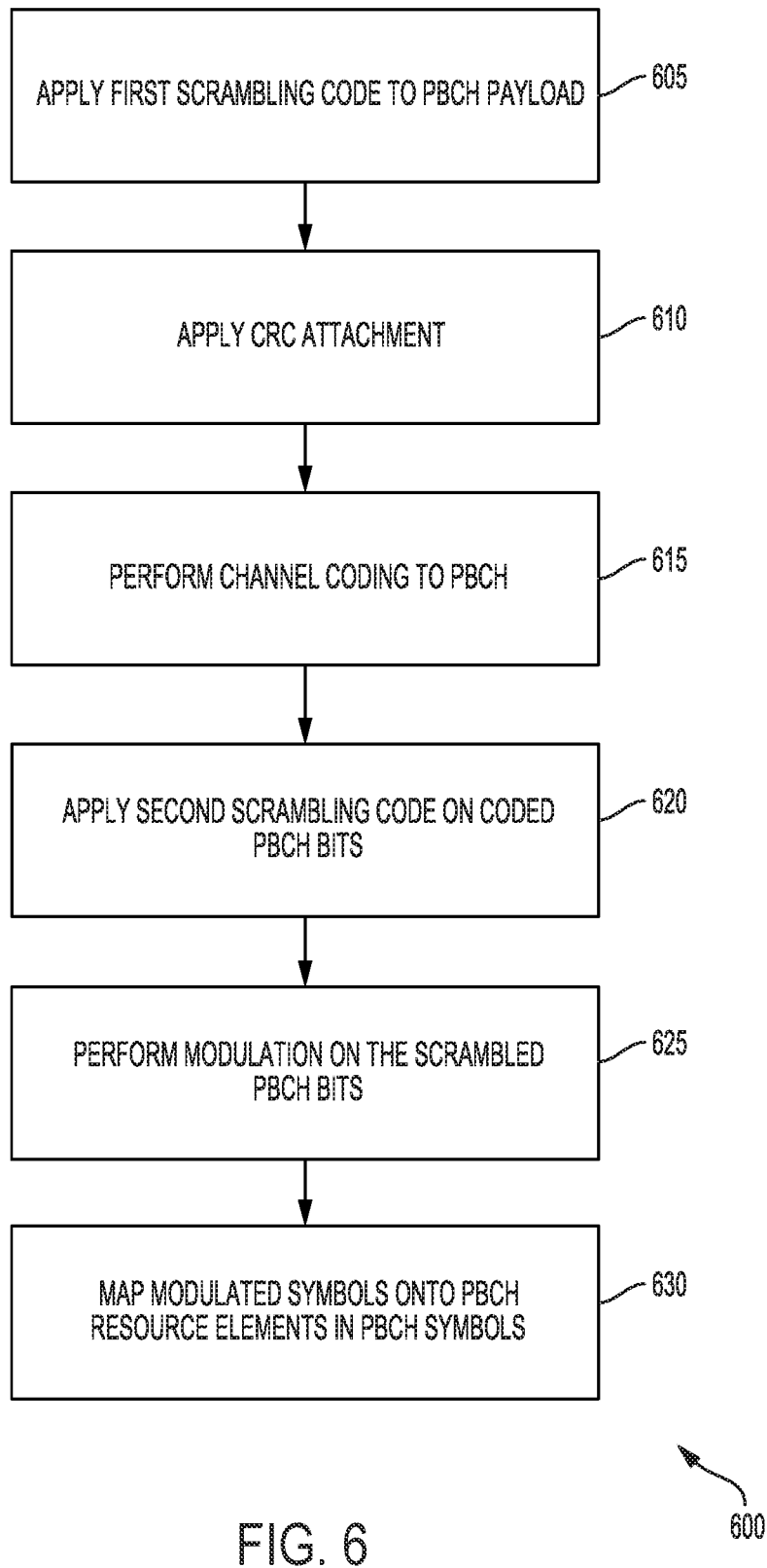
FIG. 6 illustrates an example process for scrambling PBCH bits.

In some instances, the base station 105 may perform a scrambling process to the SS block prior to transmission. The scrambling process may allow a UE 115 to determine an intended signal as distinguished from potential interfering signals sent by base stations 105 from neighboring cells. FIG. 6 illustrates one example of a scrambling process 600 that a base station 105 may use to scramble the PBCH of a SS block. At 605, the base station 105 may apply a first scrambling code to the PBCH payload. In some instances, generation of the first scrambling code is initialized using a cell identification (cell ID) and a part of a system frame number (SFN), such as the three least significant bits of the SFN, or the second or third least significant bits of the SFN. The base station 105 may apply the first scrambling code to the PBCH payload but not to other information carried in the PBCH, such as the SS block index, half radio frame (if present), and the part of the SFN used to initialize the first scrambling code. In other words, the SS block index and other information may be excluded from scrambling based on the first scrambling code.

The output of the scrambling at 605 is a partially scrambled PBCH payload. At 610, the base station 105 may apply a cyclic redundancy check (CRC) to the partially scrambled PBCH payload. At 615, the base station 105 may apply channel coding and perform rate matching to obtain coded PBCH bits. At 620, the base station 105 may apply a second scrambling code on the coded PBCH bits. The second scrambling code may be applied to introduce randomization into the PBCH because a portion of the PBCH was not scrambled by the first scrambling code. After the PBCH bits are scrambled, the base station 105 may perform modulation at 625 and then map the modulated symbols onto PBCH resource elements in PBCH symbols at 630.

In some instances, the base station 105 may generate the second scrambling code such that blind decoding can be avoided at the UE 115 when descrambling the PBCH based on the second scrambling code. The second scrambling sequences may be the same or different for SS blocks within a SS burst set. The base station 105 may use identical sequences across SS burst sets within a Broadcast Channel (BCH) Transmission Time Interval (TTI).

In some implementations, the second scrambling sequence may be different for different SS blocks within a SS burst set. The base station 105 may generate a pseudo-noise (PN) sequence of length M*T, where M is the number of SS blocks in each SS block group and T is the total number of coded PBCH bits. The generator of the PN sequence is initialized by the physical cell ID. In some instances, the generator of the PN sequence is initialized by the physical cell ID alone without any portion of the system frame number. The base station 105 may then partition the PN sequence into M PN sub-sequences, where each sub-sequence has an index of m=0, . . . , M−1, and each sub-sequence having a length of T.

The base station 105 may use a one-to-one mapping of the sub-sequence index to the SS block index. For example, the number of sub-sequences M may be the same as the number of SS blocks M within a SS block group. Accordingly, if the $m^{th}$ SS block in a group is transmitted, the base station 105 uses the $m^{th}$ sub-sequence as the second scrambling code for the coded PBCH bits for that SS block. Further, because the three least significant bits of the SS block index is transmitted in DMRS, the SS block index is indicated to the UE 115 so that the UE 115 may determine which sub-sequence is used for scrambling of PBCH coded bits based on reading the SS block index bits found in DMRS.

In an example, a SS burst set may comprise 64 SS blocks, divided into eight groups of M=8 SS blocks per group. Since there are eight SS blocks per group, the base station 105 generates a PN sequence of length M*T, and partitions the PN sequence into eight sub-sequences for applying the second scrambling code. Although the SS block index for all 64 SS blocks are numbered from 0 to 63, within each group the three least significant bits of the SS block index are: 000, 001, 010, 011, 100, 101, 110, and 111. The three least significant bits of the SS block index for a SS block are conveyed in DMRS of that SS block. Accordingly, the base station 105 uses a different sub-sequence for scrambling coded PBCH bits of each of the eight SS blocks within a group. For the SS block corresponding to 000, the base station 105 uses the sub-sequence with the same 000 index to apply to PBCH of SS block index 000 as the second scrambling code, and similarly for the remaining seven SS blocks in the group. By reading the three least significant bits of the SS block index in DMRS, a UE 115 may determine the sub-sequence used and descramble the PBCH coded bits without blind decoding.

In some instances, the base station 105 may apply a same sub-sequence to corresponding SS blocks across different SS block groups. For example, the base station 105 may apply the $m^{th}$ sub-sequence to the PBCH of the $m^{th}$ SS block of SS block group 1 as well as to the $m^{th}$ SS block of each remaining group in the SS burst set.

In some implementations, the base station 105 may apply the same scrambling sequence to SS blocks within a SS burst set, instead of applying different sub-sequences to SS blocks within the SS burst set. The sequences applied, however, may be identical across SS burst sets within a Broadcast Channel (BCH) Transmission Time Interval (TTI) (e.g., 80 ms).

Returning to 605 of FIG. 6, the base station 105 may apply similar techniques for the first scrambling code. For example, the base station 105 may apply the same or different scrambling sequences for SS blocks within a SS burst set. If the base station 105 applies the same scrambling sequence to SS blocks within the SS burst set, the length of the sequence is equal to the number of PBCH payload bits to be scrambled. If, however, the base station 105 applies a different scrambling sequence to different SS blocks in the SS burst set, the scrambling sequence length may be equal to the number of SS blocks per group M multiplied by the number of PBCH payload bits to be scrambled. Similar to generation of sub-sequences for the second scrambling code, the base station 105 may partition the scrambling sequence into M sub-sequences (the same number M of SS blocks per group). The base station 105 may use a one-to-one mapping of the sub-sequence index to the SS block index. For example, the number of sub-sequences M may be the same as the number of SS blocks M within a SS block group. Accordingly, if the $m^{th}$ SS block in a group is transmitted, the base station 105 uses the $m^{th}$ sub-sequence as the first scrambling code for the PBCH payload bits to be scrambled for that SS block. Further, because the three least significant bits of the SS block index is transmitted in DMRS, the SS block index is indicated to the UE 115 so that the UE 115 may determine which sub-sequence is used for scrambling of PBCH payload bits based on reading the SS block index bits found in DMRS. The first scrambling codes used may be different from one SS burst set to another in the same BCH TTI (e.g., 80 ms), because the first scrambling codes are initialized by both the cell ID as well as a portion of the SFN bits.

Figure 7:
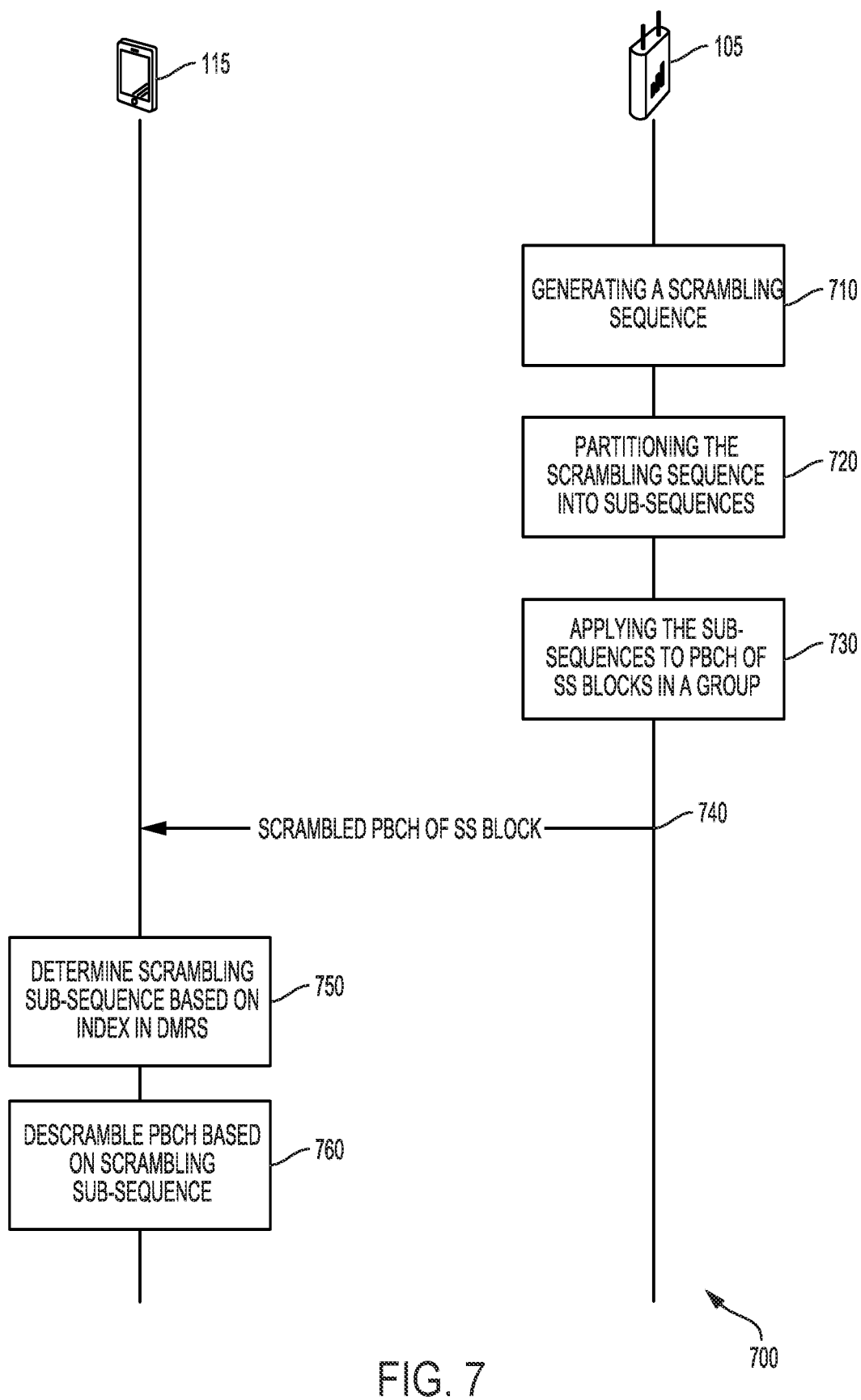
FIG. 7 illustrates an example process flow in a system that supports scrambling techniques in accordance with aspects of the present disclosure.

FIG. 7 illustrates an example of a process flow 700 in a system that supports PBCH scrambling techniques in accordance with aspects of the present disclosure. Process flow 700 may include base station 105 and UE 115, which may be examples of the corresponding devices described with reference to FIGS. 1-2.

At 710, a base station 105 generates a scrambling sequence, which may be a PN sequence in some instances. At 720, the base station 105 partitions the scrambling sequence into sub-sequences. As described above, the base station 105 may partition the sequence into the same number of sub-sequences as a number of SS blocks in a SS block group such that there is a one-to-one mapping of each SS block in the group to a different sub-sequence. At 730, the base station applies the sub-sequences to PBCH of their respective SS blocks in the group to scramble the PBCH. At 740, the base station 105 transmits the scrambled PBCH of the SS block to a UE 115. The base station 105 may also transmit a SS block index associated with each SS block in the group in DMRS for the SS block. At 750, the UE determines the scrambling sub-sequence based on the SS block index information in DMRS. At 760, the UE descrambles the PBCH based on the determined scrambling sub-sequence.

Figure 8:
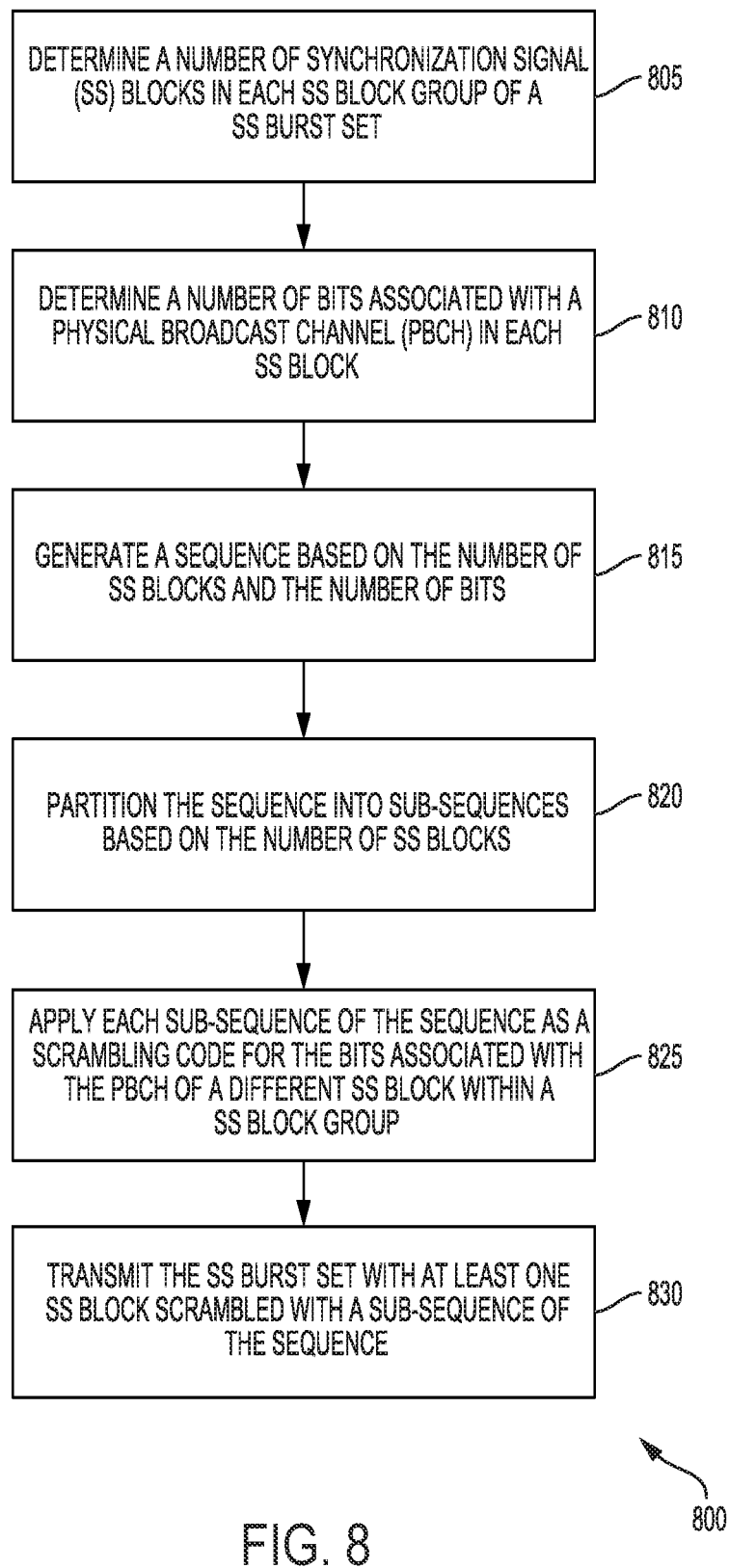
FIG. 8 illustrates a method for generating scrambling sequences in accordance with aspects of the present disclosure.

FIG. 8 shows a flowchart illustrating a process 800 for PBCH scrambling techniques in accordance with various aspects of the present disclosure. The operations of process 800 may be implemented by a device such as a base station 105 or its components, as described with reference to FIGS. 1 and 2. For example, the operations of process 800 may be performed by the processor 240, either alone or in combination with other components, as described herein. In some examples, the base station 105 may execute a set of codes to control the functional elements of the device to perform the functions described below. Additionally or alternatively, the base station 105 may perform aspects of the functions described below using special-purpose hardware.

At 805, the base station 105 determines a number of synchronization signal (SS) blocks in each SS block group of a SS burst set. At 810, the base station 105 determines a number of bits associated with a Physical Broadcast Channel (PBCH) in each SS block. At 815, the base station generates a sequence based on the number of SS blocks and the number of bits. In some instances, operations 805 and 810 may be optional, and the base station may generate a sequence for use in scrambling the PBCH at 815. At 820, the base station 105 partitions the sequence into sub-sequences based on the number of SS blocks. At 825, the base station 105 applies each sub-sequence of the sequence as a scrambling code for the bits associated with the PBCH of a different SS block within a SS block group. At 830, the base station 105 transmits the SS burst set with at least one SS block scrambled with a sub-sequence of the sequence.

Figure 9:
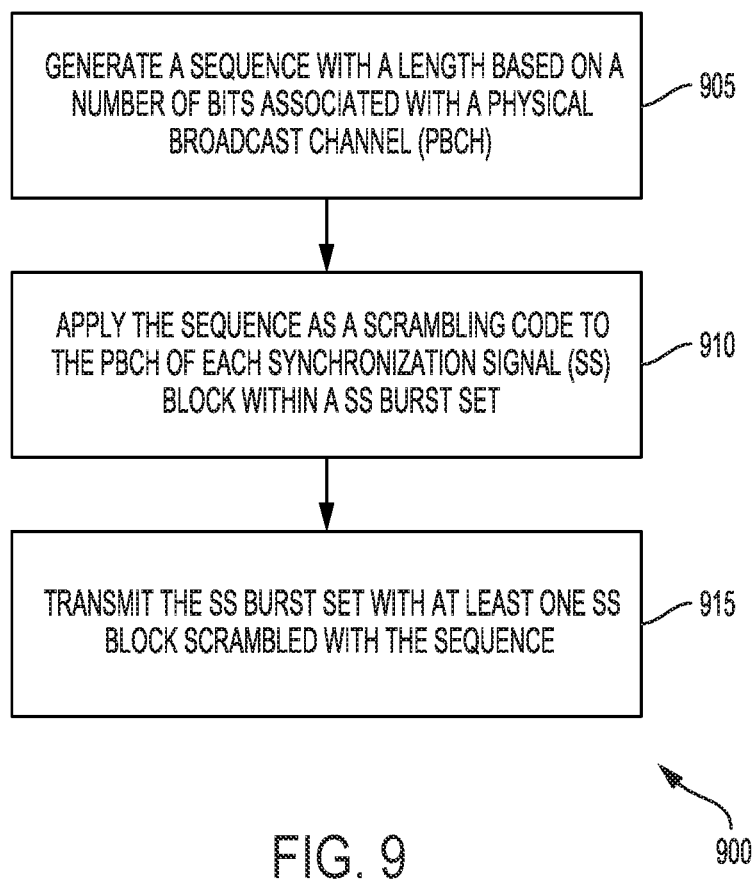
FIG. 9 illustrates a method for generating scrambling sequences in accordance with aspects of the present disclosure.

FIG. 9 shows a flowchart illustrating a process 900 for PBCH scrambling techniques in accordance with various aspects of the present disclosure. The operations of process 900 may be implemented by a device such as a base station 105 or its components, as described with reference to FIGS. 1 and 2. For example, the operations of process 900 may be performed by the processor 240, either alone or in combination with other components, as described herein. In some examples, the base station 105 may execute a set of codes to control the functional elements of the device to perform the functions described below. Additionally or alternatively, the base station 105 may perform aspects of the functions described below using special-purpose hardware.

At 905, the base station 105 generates a sequence with a length based on a number of bits associated with a Physical Broadcast Channel (PBCH). At 910, the base station 105 applies the sequence as a scrambling code to the PBCH of each synchronization signal (SS) block within a SS burst set. At 915, the base station 105 transmits the SS burst set with at least one SS block scrambled with the sequence.

Figure 10:
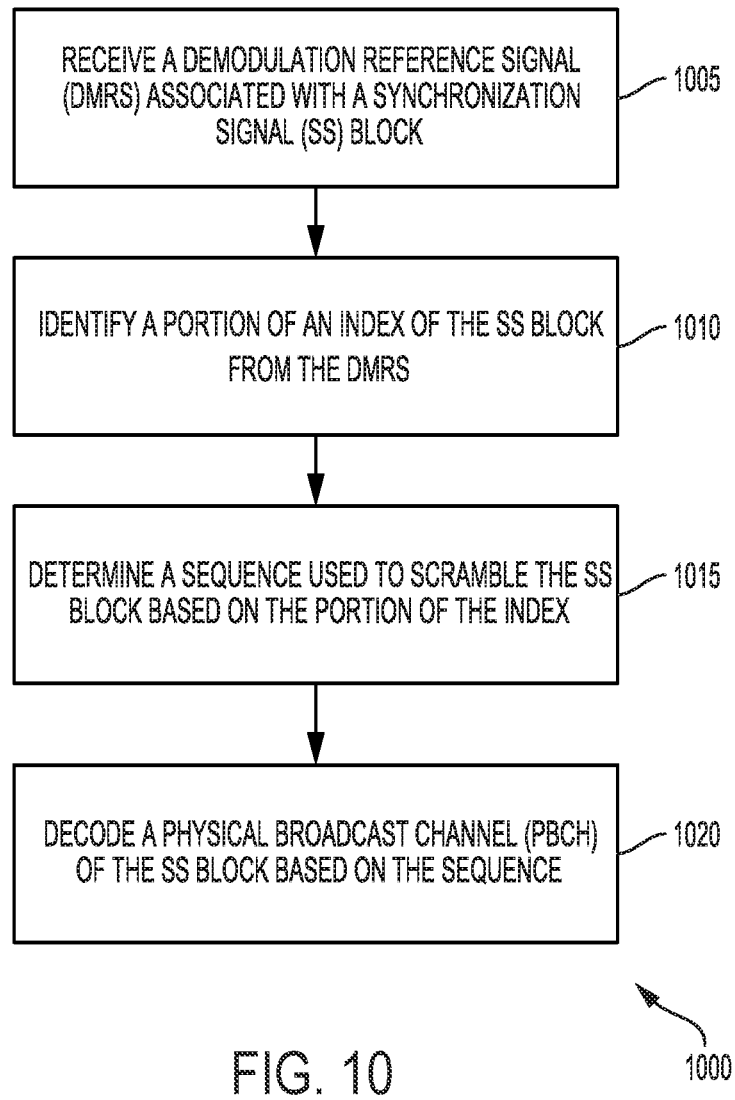
FIG. 10 illustrates a method for descrambling scrambling sequences in accordance with aspects of the present disclosure.

FIG. 10 shows a flowchart illustrating a process 1000 for compressed SS block indication techniques in accordance with various aspects of the present disclosure. The operations of process 1000 may be implemented by a device such as a UE 115 or its components, as described with reference to FIGS. 1 and 2. For example, the operations of process 1000 may be performed by the processor 280, either alone or in combination with other components, as described herein. In some examples, the UE 115 may execute a set of codes to control the functional elements of the device to perform the functions described below. Additionally or alternatively, the UE 115 may perform aspects of the functions described below using special-purpose hardware.

At 1005, the UE 115 receives a demodulation reference signal (DMRS) associated with a synchronization signal (SS) block. At 1010, the UE 115 identifies a portion of an index of the SS block from the DMRS. At 1015, the UE 115 determines a sequence used to scramble the SS block based on the portion of the index. At 1020, the UE 115 decodes a Physical Broadcast Channel (PBCH) of the SS block based on the sequence.

Figure 11:
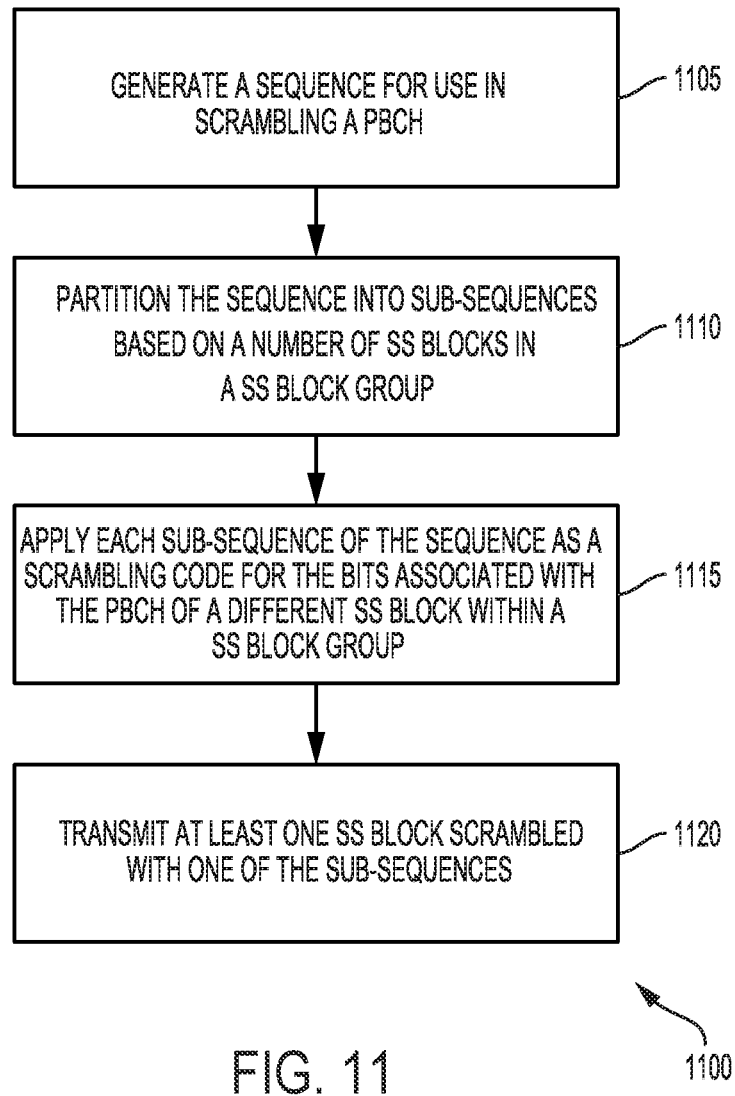
FIG. 11 illustrates a method for generating scrambling sequences in accordance with aspects of the present disclosure.

FIG. 11 shows a flowchart illustrating a process 800 for PBCH scrambling techniques in accordance with various aspects of the present disclosure. The operations of process 800 may be implemented by a device such as a base station or its components, as described with reference to FIGS. 1 and 2. For example, the operations of process 800 may be performed by the processor 240, either alone or in combination with other components, as described herein. In some examples, the base station 105 may execute a set of codes to control the functional elements of the device to perform the functions described below. Additionally or alternatively, the base station 105 may perform aspects of the functions described below using special-purpose hardware.

At 1105, the base station 105 generates a sequence for use in scrambling a PBCH. At 1110, the base station 105 partitions the sequence into sub-sequences based on a number of SS blocks in a SS block group. At 1115, the base station 105 applies each sub-sequence of the sequence as a scrambling code for the bits associated with the PBCH of a different SS block within a SS block group. At 1120, the base station 105 transmits at least one SS block scrambled with one of the sub-sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 2 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for scrambling a broadcast channel, the method comprising:
   generating a sequence for use in scrambling a PBCH;
   partitioning the sequence into sub-sequences based on a number of SS blocks in a SS block group;
   applying each sub-sequence of the sequence as a scrambling code for the bits associated with the PBCH of a different SS block within a SS block group;
   transmitting at least one SS block scrambled with one of the sub-sequences; and
   wherein generating the sequence comprises:
      determining a number of synchronization signal (SS) blocks in each SS block group of a SS burst set;
      determining a number of bits associated with the PBCH in each SS block; and
      generating the sequence based on the number of SS blocks and the number of bits.

2. The method of claim 1, wherein the sequence is a pseudo-noise (PN) sequence generated based on a physical cell identification (ID) of a base station.

3. The method of claim 2, wherein the PN sequence is generated such that a length of the PN sequence is a product of the number of SS blocks and a number of coded PBCH bits.

4. The method of claim 1, wherein the sequence is generated based on a physical cell identification (ID) of a base station and a portion of system frame number (SFN) bits.

5. The method of claim 1, wherein the bits associated with the PBCH comprise bits of a payload of the PBCH to be scrambled in a SS block.

6. The method of claim 5, wherein the sequence is generated such that a length of the sequence is a product of the number of SS blocks and the number of PBCH bits to be scrambled.

7. The method of claim 1, wherein a particular sub-sequence applied to a particular SS block is unique to the particular SS block within the SS block group.

8. The method of claim 1, wherein a particular sub-sequence applied to a particular SS block is a same sub-sequence applied to a corresponding SS block in another SS block group of a SS burst set.

9. The method of claim 1, wherein a number of least significant bits of a SS block index of the at least one SS block are included in a demodulation reference signal (DMRS) signal of the at least one SS block.

10. The method of claim 9, wherein remaining bits of the SS block index are included in a payload of a PBCH of the at least one SS block.

11. The method of claim 9, wherein each sub-sequence of the sequence corresponds to a different one of the number of least significant bits of the SS block index included in the DMRS signal.

12. The method of claim 9, wherein the number of least significant bits of the SS block index comprises the two least significant bits or the three least significant bits.

13. An apparatus for scrambling a broadcast channel, comprising:
   a processor;
   memory in electronic communication with the processor; and
   instructions stored in the memory and operable, when executed by the processor, to cause the apparatus to:
      generate a sequence for use in scrambling a PBCH;
      partition the sequence into sub-sequences based on a number of SS blocks in a SS block group;
      apply each sub-sequence of the sequence as a scrambling code for the bits associated with the PBCH of a different SS block within a SS block group;
      transmit at least one SS block scrambled with one of the sub-sequences; and
      wherein generating the sequence comprises:
         determining a number of synchronization signal (SS) blocks in each SS block group of a SS burst set;
         determining a number of bits associated with the PBCH in each SS block; and
         generating the sequence based on the number of SS blocks and the number of bits.

14. The apparatus of claim 13, wherein the sequence is a pseudo-noise (PN) sequence generated based on a physical cell identification (ID) of a base station.

15. The apparatus of claim 13, wherein the PN sequence is generated such that a length of the PN sequence is a product of the number of SS blocks and a number of coded PBCH bits.

16. The apparatus of claim 13, wherein the sequence is generated based on a physical cell identification (ID) of a base station and a portion of system frame number (SFN) bits.

17. The apparatus of claim 16, wherein the bits associated with the PBCH comprise bits of a payload of the PBCH to be scrambled in a SS block.

18. The apparatus of claim 17, wherein the sequence is generated such that a length of the sequence is a product of the number of SS blocks and the number of PBCH bits to be scrambled.

19. The apparatus of claim 13, wherein a particular sub-sequence applied to a particular SS block is unique to the particular SS block within the SS block group.

20. The apparatus of claim 13, wherein a particular sub-sequence applied to a particular SS block is a same sub-sequence applied to a corresponding SS block in another SS block group of a SS burst set.

21. The apparatus of claim 13, wherein a number of least significant bits of a SS block index of the at least one SS block are included in a demodulation reference signal (DMRS) signal of the at least one SS block.

22. The apparatus of claim 21, wherein remaining bits of the SS block index are included in a payload of a PBCH of the at least one SS block.

23. The apparatus of claim 21, wherein each sub-sequence of the sequence corresponds to a different one of the number of least significant bits of the SS block index included in the DMRS signal.

24. The apparatus of claim 21, wherein the number of least significant bits of the SS block index comprises the two least significant bits or the three least significant bits.

25. A method comprising:
   receiving a demodulation reference signal (DMRS) associated with a synchronization signal (SS) block;
   identifying a portion of an index of the SS block from the DMRS;

determining a sequence used to scramble the SS block based on the portion of the index;

decoding a Physical Broadcast Channel (PBCH) of the SS block based on the sequence; and wherein the portion of the index comprises a number of least significant bits of the index.

26. The method of claim 25, wherein the decoding of the PBCH is performed without blind decoding.

27. The method of claim 25, wherein the sequence comprises a sub-sequence of a pseudo-noise (PN) sequence.

28. The method of claim 25, further comprising determining different sequences for decoding the PBCH of different SS blocks within an SS block group.

29. The method of claim 25, further comprising determining the sequence for decoding the PBCH of a corresponding SS block within a different SS block group.

30. An apparatus for scrambling a broadcast channel, comprising:

a processor;

memory in electronic communication with the processor; and instructions stored in the memory and operable, when executed by the processor, to cause the apparatus to:

receive a demodulation reference signal (DMRS) associated with a synchronization signal (SS) block;

identify a portion of an index of the SS block from the DMRS;

determine a sequence used to scramble the SS block based on the portion of the index;

decode a Physical Broadcast Channel (PBCH) of the SS block based on the sequence; and wherein the portion of the index comprises a number of least significant bits of the index.

31. The apparatus of claim 30, wherein the decoding of the PBCH is performed without blind decoding.

32. The apparatus of claim 30, wherein the sequence comprises a sub-sequence of a pseudo-noise (PN) sequence.

33. The apparatus of claim 30, the instructions further operable to cause the apparatus to determine different sequences for decoding the PBCH of different SS blocks within an SS block group.

34. The apparatus of claim 30, the instructions further operable to cause the apparatus to determine the sequence for decoding the PBCH of a corresponding SS block within a different SS block group.

* * * * *